(12) United States Patent
Fukui et al.

(10) Patent No.: US 10,943,743 B2
(45) Date of Patent: Mar. 9, 2021

(54) ELECTROLYTIC CAPACITOR AND METHOD FOR PRODUCING SAME

(71) Applicant: Panasonic Intellectual Property Management Co., Ltd., Osaka (JP)

(72) Inventors: Hitoshi Fukui, Nara (JP); Shinya Suzuki, Kyoto (JP); Koji Okamoto, Kyoto (JP); Makoto Nagashima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/270,309

(22) Filed: Feb. 7, 2019

(65) Prior Publication Data

US 2019/0172656 A1  Jun. 6, 2019

Related U.S. Application Data

(63) Continuation of application No. PCT/JP2017/028697, filed on Aug. 8, 2017.

(30) Foreign Application Priority Data

Aug. 31, 2016 (JP) .............................. JP2016-169564

(51) Int. Cl.
*H01G 9/028* (2006.01)
*C08L 65/00* (2006.01)
(Continued)

(52) U.S. Cl.
CPC .............. *H01G 9/028* (2013.01); *C08L 65/00* (2013.01); *C08L 79/02* (2013.01); *H01G 9/15* (2013.01);
(Continued)

(58) Field of Classification Search
CPC ....................................................... H01G 9/028
See application file for complete search history.

(56) References Cited

U.S. PATENT DOCUMENTS 6,001,281 A  12/1999  Lessner et al.
6,154,358 A *  11/2000  Fukaumi ................ H01G 9/025
361/523

(Continued)

FOREIGN PATENT DOCUMENTS

CN    102199288 A   9/2011
JP    2002-524593   8/2002
(Continued)

OTHER PUBLICATIONS

International Search Report of PCT application No. PCT/JP2017/028697 dated Oct. 31, 2017.
(Continued)

*Primary Examiner* — Eric W Thomas
(74) *Attorney, Agent, or Firm* — McDermott Will and Emery LLP

(57) ABSTRACT

An electrolytic capacitor includes an anode body, a dielectric layer disposed on the anode body, a solid electrolyte layer disposed on the dielectric layer, and a cathode lead-out layer disposed on the solid electrolyte layer. The solid electrolyte layer contains a first conductive polymer having a thiophene skeleton and a second conductive polymer having an aniline skeleton. In the solid electrolyte layer, a mass ratio of the second conductive polymer with respect to a total mass of the first conductive polymer and the second conductive polymer in a region close to the dielectric layer is greater than a mass ratio of the second conductive polymer with respect to a total mass of the first conductive polymer and the second conductive polymer in a region close to the cathode lead-out layer.

15 Claims, 1 Drawing Sheet

(51) Int. Cl.
*C08L 79/02* (2006.01)
*H01G 9/15* (2006.01)
*H01B 1/12* (2006.01)
*H01G 9/00* (2006.01)

(52) U.S. Cl.
CPC ............ *C08G 2261/1424* (2013.01); *C08G 2261/3221* (2013.01); *C08G 2261/3223* (2013.01); *C08G 2261/794* (2013.01); *H01B 1/127* (2013.01); *H01B 1/128* (2013.01); *H01G 9/0036* (2013.01)

(56) References Cited

U.S. PATENT DOCUMENTS

2006/0236531 A1   10/2006   Merker et al.
2008/0204975 A1*  8/2008   Iwasa .............. H01G 9/0036
                                                361/525
2011/0096466 A1*  4/2011   Horacek ............ H01G 11/78
                                                361/525
2011/0233450 A1   9/2011   Nobuta et al.

FOREIGN PATENT DOCUMENTS

JP   2012-199595   10/2012
JP   2015-095616   5/2015

OTHER PUBLICATIONS

English Translation of Chinese Search Report dated May 20, 2020 for the related Chinese Patent Application No. 201780051779.1.

* cited by examiner

ELECTROLYTIC CAPACITOR AND METHOD FOR PRODUCING SAME

RELATED APPLICATIONS

This application is a continuation of the PCT International Application No. PCT/JP2017/028697 filed on Aug. 8, 2017, which claims the benefit of foreign priority of Japanese patent application No. 2016-169564 filed on Aug. 31, 2016, the contents all of which are incorporated herein by reference.

BACKGROUND

1. Technical Field

The present disclosure relates to an electrolytic capacitor having a solid electrolyte layer containing a conductive polymer, and a method for producing the same.

2. Description of the Related Art

As small-sized, large-capacitance, and low equivalent series resistance (ESR) capacitors, promising candidates are electrolytic capacitors including an anode body with a dielectric layer formed thereon and a solid electrolyte layer formed so as to cover at least a part of the dielectric layer. Conductive polymer layers containing poly(3,4-ethylenedioxythiophene)(PEDOT) are widely used for the solid electrolyte layer (refer to Japanese Translation of PCT International Application Publication No. 2002-524593).

SUMMARY

An electrolytic capacitor according to a first aspect of the present disclosure includes an anode body, a dielectric layer disposed on the anode body, a solid electrolyte layer disposed on the dielectric layer, and a cathode lead-out layer disposed on the solid electrolyte layer. The solid electrolyte layer contains a first conductive polymer having a thiophene skeleton and a second conductive polymer having an aniline skeleton. In the solid electrolyte layer, a mass ratio of the second conductive polymer with respect to a total mass of the first conductive polymer and the second conductive polymer in a region close to the dielectric layer is greater than a mass ratio of the second conductive polymer with respect to a total mass of the first conductive polymer and the second conductive polymer in a region close to the cathode lead-out layer.

A method for producing an electrolytic capacitor according to a second aspect of the present disclosure includes a first step and a second step below. The first step is allowing a first conductive polymer and a second conductive polymer to adhere to an anode body having a dielectric layer formed on a surface of the anode body by bringing a first treatment liquid to contact the anode body. The first treatment liquid contains the first conductive polymer having a thiophene skeleton and the second conductive polymer having an aniline skeleton. The second step is allowing, after the first step, at least the first conductive polymer to adhere to the anode body by bringing a second treatment liquid to contact the anode body to which the first conductive polymer and the second conductive polymer have adhered. The second treatment liquid contains the first conductive polymer and has a smaller mass ratio of the second conductive polymer with respect to a total mass of the first conductive polymer and the second conductive polymer than the first treatment liquid.

According to the present disclosure, capacitance decrease of the electrolytic capacitor caused by repeated charging and discharging can be suppressed. Further, an electrolytic capacitor having a high capacitance and excellent in withstand voltage characteristics can be obtained.

DETAILED DESCRIPTION OF EMBODIMENT

Figure 1:
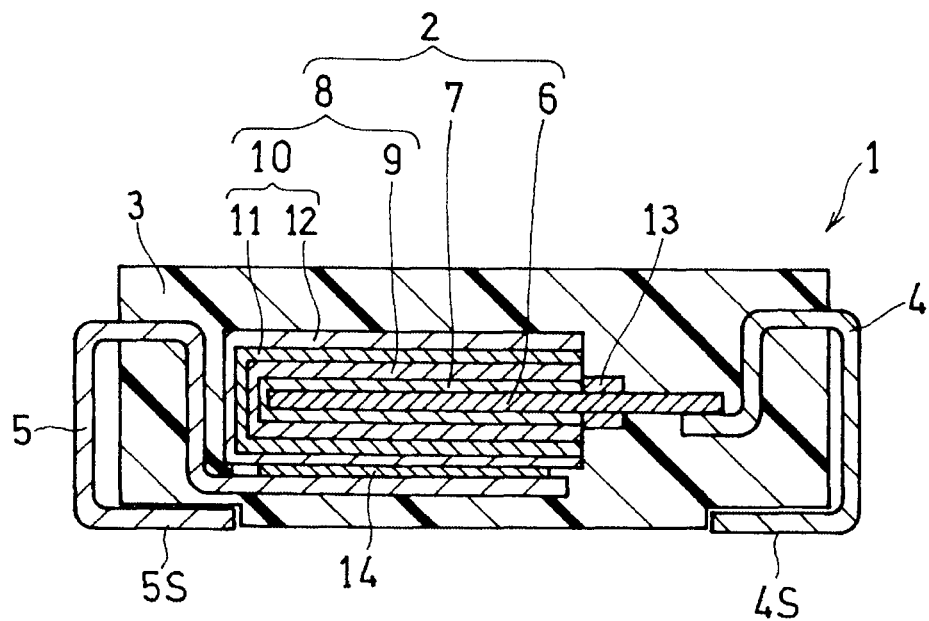
FIG. 1 is a schematic cross-sectional view illustrating an electrolytic capacitor according to one exemplary embodiment of the present disclosure.

In the above-described conventional electrolytic capacitor, the conductive polymer layer containing a poly(3,4-ethylenedioxythiophene) (PEDOT) formed on the dielectric layer easily shrinks by repeated charging and discharging, and thus repeated charging and discharging may cause adhesiveness between the conductive polymer layer and the dielectric layer to decrease, thereby decreasing the capacitance of the electrolytic capacitor.

Accordingly, the present disclosure provides an electrolytic capacitor excellent in repeated charging and discharging characteristics, and a method for producing the same.

[Electrolytic Capacitor]

An electrolytic capacitor according to one exemplary embodiment of the present disclosure includes an anode body, a dielectric layer disposed on the anode body, a solid electrolyte layer disposed on the dielectric layer, and a cathode lead-out layer disposed on the solid electrolyte layer.

The solid electrolyte layer contains a first conductive polymer having a thiophene skeleton and a second conductive polymer having an aniline skeleton. And a mass ratio of a second conductive polymer in a region at the dielectric layer side of the solid electrolyte layer is greater than a mass ratio of a second conductive polymer in a region at the cathode lead-out layer side of the solid electrolyte layer.

More specifically, a mass ratio $W_{2x}$ of a second conductive polymer contained in a region at the dielectric layer side of the solid electrolyte layer and a mass ratio $W_{2y}$ of a second conductive polymer contained in a region at the cathode lead-out layer side of the solid electrolyte layer satisfy a relational formula (1):

$$0 \leq W_{2y}/W_{2x} < 1, \text{ and } 0 < W_{2x} \qquad (1).$$

Here, when two or more arbitrary positions in the solid electrolyte layer are compared, if a region including a position where a distance from a surface of the dielectric layer is small, it means that the region is at the dielectric layer side of the solid electrolyte layer. And if a region including a position where a distance from the surface of the dielectric layer is large (a region including a place where a distance from a surface of the cathode lead-out layer is small), it means that the region is at the cathode lead-out layer side of the solid electrolyte layer.

Here, $W_{2x}$ represents a mass ratio (parts by mass) of the second conductive polymer contained in a region at the dielectric layer side of the solid electrolyte layer with respect to 100 parts by mass of the total of the first conductive polymer and the second conductive polymer contained in a region at the dielectric layer side of the solid electrolyte layer. $W_{2y}$ represents a mass ratio (parts by mass) of the second conductive polymer contained in a region at the cathode lead-out layer side of the solid electrolyte layer with respect to 100 parts by mass of the total of the first conductive polymer and the second conductive polymer contained in a region at the cathode lead-out layer side of the solid electrolyte layer.

In a case where the mass ratio of the second conductive polymer in the region at the dielectric layer side of the solid electrolyte layer is greater than the mass ratio of the second conductive polymer in the region at the cathode lead-out layer side of the solid electrolyte layer, that is, in a case where the relational formula (1) is satisfied, capacitance decrease after the repeated charging and discharging is suppressed. Further, an electrolytic capacitor having a high capacitance and excellent in withstand voltage characteristics can be obtained. $W_{2y}/W_{2x}$ ranges preferably from 0 to 0.8, inclusive, and more preferably from 0 to 0.5, inclusive.

The solid electrolyte layer (in a region at the dielectric layer side and in a region at the cathode lead-out layer side) contains a first conductive polymer having a thiophene skeleton. Thus, an electrolytic capacitor having a high capacitance and excellent in withstand voltage characteristics can be obtained.

At least the region at the dielectric layer side of the solid electrolyte layer contains the second conductive polymer, and thus shrinkage of the solid electrolyte layer (in the region at the dielectric layer side) due to the repeated charging and discharging is reduced. That is, shrinkage of the solid electrolyte layer (in the region at the dielectric layer side) due to the repeated charging and discharging is suppressed, and thus the solid electrolyte layer is hardly peeled off from the dielectric layer or the like. Therefore, capacitance decrease of the electrolytic capacitor after the repeated charging and discharging is suppressed.

The region at the cathode lead-out layer side of the solid electrolyte layer may not contain the second conductive polymer, but desirably contains the second conductive polymer from the viewpoint of further suppressing the capacitance decrease after the repeated charging and discharging. However, in a case where the mass ratio of the second conductive polymer contained in a region at the cathode lead-out layer side of the solid electrolyte layer is greater than or equal to the mass ratio of the second conductive polymer contained in a region at the dielectric layer side of the solid electrolyte layer, that is, in a case where $1 \leq W_{2y}/W_{2x}$ is satisfied, the withstand voltage characteristics decline because the mass ratio of the first conductive polymer contained in the region at the cathode lead-out layer side of the solid electrolyte layer is relatively small. In addition, an initial capacitance may decrease.

In a case where the region at the dielectric layer side of the solid electrolyte layer does not contain the second conductive polymer, that is, in a case of $W_{2x}=0$, the capacitance after the repeated charging and discharging decreases.

The solid electrolyte layer is formed so as to cover at least a part of the dielectric layer and is in contact with the dielectric layer. The solid electrolyte layer may be attached with the dielectric layer via a silicon-containing layer formed of a residue of silane coupling agent used for modifying the surface of the dielectric layer, and may be directly attached with the dielectric layer.

At least a part of the anode body is porous and a part of the solid electrolyte layer intrudes into holes of the anode body. And a mass ratio of the second conductive polymer in a portion of the solid electrolyte layer that exists inside the holes of the anode body is preferably greater than a mass ratio of the second conductive polymer in a portion of the solid electrolyte layer that exists outside the holes of the anode body. The second conductive polymer may not be contained outside the holes of the anode body.

More specifically, at least a part of the anode body is porous and a part of the solid electrolyte layer intrudes into holes of the anode body. And a mass ratio $W_{2n}$ of the second conductive polymer in a portion of the solid electrolyte layer that exists inside the holes of the anode body and a mass ratio $W_{2o}$ of the second conductive polymer in a portion of the solid electrolyte layer that exists outside the holes of the anode body preferably satisfy a relational formula (2):

$$0 \leq W_{2o}/W_{2n} < 1, \text{ and } 0 < W_{2n} \quad (2).$$

Here, Wen represents a mass ratio (parts by mass) of the second conductive polymer in a portion of the solid electrolyte layer that exists inside the holes of the anode body with respect to 100 parts by mass of the total of the first conductive polymer and the second conductive polymer present in a portion of the solid electrolyte layer that exists inside the holes of the anode body. $W_{2o}$ represents a mass ratio (parts by mass) of the second conductive polymer present in a portion of the solid electrolyte layer that exists outside the holes of the anode body with respect to 100 parts by mass of the total of the first conductive polymer and the second conductive polymer present in a portion of the solid electrolyte layer that exists outside the holes of the anode body.

In a case where a mass ratio of the second conductive polymer in a portion of the solid electrolyte layer that exists inside the holes of the anode body is greater than a mass ratio of the second conductive polymer in a portion of the solid electrolyte layer that exists outside the holes of the anode body, that is, in a case where the relational formula (2) is satisfied, peeling off from the dielectric layer due to shrinkage of the solid electrolyte layer (particularly in the region at the dielectric side) caused by repeated charging and discharging is further suppressed. $W_{2o}/W_{2n}$ ranges more preferably from 0 to 0.8, inclusive, and further more preferably from 0 to 0.5, inclusive.

The mass ratio ($W_{2n}$) of the second conductive polymer in a portion of the solid electrolyte layer that exists inside the holes of the anode body ranges preferably from 5 parts by mass to 80 parts by mass, inclusive, with respect to 100 parts by mass of the total of the first conductive polymer and the second conductive polymer in a portion of the solid electrolyte layer that exists inside the holes of the anode body. In this case, peeling off from the dielectric layer due to shrinkage of the solid electrolyte layer (particularly in a region at the dielectric side) caused by repeated charging and discharging is further suppressed.

When the mass ratio of the second conductive polymer in a portion of the solid electrolyte layer that exists inside the holes of the anode body is 5 parts by mass or more with respect to 100 parts by mass of the total of the first conductive polymer and the second conductive polymer in a portion of the solid electrolyte layer that exists inside the holes of the anode body, an effect (effect of suppressing capacitance decrease after repeated charging and discharging) by containing the second conductive polymer can be further increased. When the mass ratio of the second conductive polymer in a portion of the solid electrolyte layer that exists inside the holes of the anode body is less than or equal to 80 parts by mass with respect to 100 parts by mass of the total of the first conductive polymer and the second conductive polymer in a portion of the solid electrolyte layer that exists inside the holes of the anode body, an effect (effect of increasing capacitance and improving withstand voltage characteristics) by containing the first conductive polymer can be further increased.

Preferably, the first conductive polymer having a thiophene skeleton is a polythiophene or a derivative thereof. Examples of derivatives of the polythiophene include poly (3-methylthiophene), poly(3-ethylthiophene), poly(3,4-dimethylthiophene), poly(3,4-diethylthiophene), and poly(3,4-ethylenedioxythiophene). Among others, from the viewpoint of higher capacitance, improvement of withstand voltage characteristics, and improvement of heat resistance, the first conductive polymer is more preferably poly(3,4-ethylene dioxythiophene) (PEDOT).

The second conductive polymer having an aniline skeleton is preferably polyaniline (PANI) or a derivative thereof. Examples of derivatives of the polyaniline include poly(2-methylaniline), poly(2-ethylaniline), and poly(2,6-dimethylaniline). Among others, PANI is more preferable from the viewpoint of suppressing capacitance decrease after repeated charging and discharging.

Since an effect of suppressing capacitance decrease after repeated charging and discharging, higher capacitance, and an effect of improving withstand voltage characteristics can be obtained with good balance, PEDOT as the first conductive polymer and PANI as the second conductive polymer are preferably used in combination.

The solid electrolyte layer may further contain other components within a range not impairing the effects of the present disclosure.

The solid electrolyte layer includes a first conductive polymer layer and a second conductive polymer layer. The second conductive polymer layer is disposed closer to the cathode lead-out layer than the first conductive polymer layer is. And a mass ratio of the second conductive polymer contained in the first conductive polymer layer is preferably greater than a mass ratio of the second conductive polymer contained in the second conductive polymer layer.

More specifically, the first conductive polymer layer contains a first-A conductive polymer having a thiophene skeleton and a second-A conductive polymer having an aniline skeleton. And the second conductive polymer layer contains a first-B conductive polymer having a thiophene skeleton and a second-B conductive polymer having an aniline skeleton. A mass ratio $W_{2a}$ of the second-A conductive polymer contained in the first conductive polymer layer and a mass ratio $W_{2b}$ of the second-B conductive polymer contained in the second conductive polymer layer satisfy a relational formula (3):

$$0 \le W_{2b}/W_{2a} < 1, \text{ and } 0 < W_{2a}.$$

Here, $W_{2a}$ represents a mass ratio (parts by mass) of the second-A conductive polymer contained in the first conductive polymer layer with respect to 100 parts by mass of the total of the first-A conductive polymer and the second-A conductive polymer contained in the first conductive polymer layer. $W_{2b}$ represents a mass ratio (parts by mass) of the second-B conductive polymer contained in the second conductive polymer layer with respect to 100 parts by mass of the total of the first-B conductive polymer and the second-B conductive polymer contained in the second conductive polymer layer.

In a case where a mass ratio of the second conductive polymer contained in the first conductive polymer layer is greater than a mass ratio of the second conductive polymer contained in the second conductive polymer layer, that is, in a case where the relational formula (3) is satisfied, capacitance decrease after the repeated charging and discharging is suppressed. Further, an electrolytic capacitor having a high capacitance and excellent in withstand voltage characteristics can be obtained. $W_{2b}/W_{2a}$ ranges preferably from 0 to 0.8, inclusive, and more preferably from 0 to 0.5, inclusive.

The solid electrolyte layer (first conductive polymer layer and second conductive polymer layer) contains a first conductive polymer (first-A conductive polymer and first-B conductive polymer) having a thiophene skeleton. Thus, an electrolytic capacitor having a high capacitance and excellent in withstand voltage characteristics can be obtained.

Since the first conductive polymer layer contains the second conductive polymer (second-A conductive polymer), shrinkage of the solid electrolyte layer (first conductive polymer layer) due to the repeated charging and discharging is reduced. That is, shrinkage of the solid electrolyte layer (first conductive polymer layer) due to the repeated charging and discharging is suppressed, and the first conductive polymer layer is hardly peeled off from the dielectric layer or the like. Therefore, capacitance decrease of the electrolytic capacitor after the repeated charging and discharging is suppressed.

The second conductive polymer layer may not contain the second conductive polymer (second-B conductive polymer), but desirably contains the second conductive polymer (second-B conductive polymer) from the viewpoint of further suppressing the capacitance decrease after the repeated charging and discharging. However, in a case where the mass ratio of the second conductive polymer contained in the second conductive polymer layer is greater than or equal to the mass ratio of the second conductive polymer contained in the first conductive polymer layer, that is, in a case where $1 \le W_{2b}/W_{2a}$ is satisfied, the withstand voltage characteristics decrease because the mass ratio of the first conductive polymer (first-B conductive polymer) is relatively small. In addition, an initial capacitance may decrease.

In a case where the first conductive polymer layer does not contain the second conductive polymer, that is, in a case of $W_{2a}=0$, the capacitance after the repeated charging and discharging decreases.

The first conductive polymer layer is formed so as to cover at least a portion of the dielectric layer and is in contact with the dielectric layer. The first conductive polymer layer may be attached with the dielectric layer via a silicon-containing layer formed of a residue of silane coupling agent used for modifying the surface of the dielectric layer. The first conductive polymer layer may be directly in close contact with the dielectric layer.

The mass ratio ($W_{2a}$) of the second-A conductive polymer contained in the first conductive polymer layer ranges preferably from 5 parts by mass to 80 parts by mass, inclusive, with respect to 100 parts by mass of the total of the first-A conductive polymer and the second-A conductive polymer. In this case, peeling off from the dielectric layer due to shrinkage of the first conductive polymer layer caused by repeated charging and discharging is further suppressed.

When the mass ratio of the second-A conductive polymer contained in the first conductive polymer layer is 5 parts by mass or more with respect to 100 parts by mass of the total of the first-A conductive polymer and the second-A conductive polymer, an effect (effect of suppressing capacitance decrease after repeated charging and discharging) by containing the second-A conductive polymer can be further increased. When the mass ratio of the second-A conductive polymer contained in the first conductive polymer layer is less than or equal to 80 parts by mass with respect to 100 parts by mass of the total of the first-A conductive polymer and the second-A conductive polymer, an effect (effect of increasing capacitance and improving withstand voltage characteristics) by containing the first-A conductive polymer can be further increased.

From the viewpoint of higher capacitance, improvement of withstand voltage characteristics, and improvement of repeated charging and discharging characteristics, the mass ratio of the second-A conductive polymer contained in the first conductive polymer layer ranges more preferably from 40 parts by mass to 75 parts by mass, inclusive, with respect to 100 parts by mass of the total of the first-A conductive polymer and the second-A conductive polymer, and further more preferably between 40 parts by mass and 60 parts by mass, inclusive.

In a case where at least a part of the anode body is porous, at least a part of the first conductive polymer layer is preferably present in holes of the anode body. In this case, adhesion between the first conductive polymer layer and the dielectric layer can be further increased and peeling off from the dielectric layer due to shrinkage of the first conductive polymer layer caused by repeated charging and discharging is further suppressed.

A thickness of the second conductive polymer layer is preferably larger than a thickness of the first conductive polymer layer. When the second conductive polymer layer has a sufficiently large thickness, the withstand voltage characteristics can be further increased.

As the first-A conductive polymer and the first-B conductive polymer, those exemplified for the first conductive polymer can be used. The first-A conductive polymer may have a molecular structure that is the same as or different from that of the first-B conductive polymer.

As the second-A conductive polymer and the second-B conductive polymer, those exemplified for the second conductive polymer can be used. The second-A conductive polymer may have a molecular structure that is the same as or different from that of the second-B conductive polymer.

Since an effect of suppressing capacitance decrease after repeated charging and discharging, higher capacitance, and an effect of improving withstand voltage characteristics can be obtained with good balance, PEDOT as the first conductive polymer (first-A conductive polymer and first-B conductive polymer) and PANI as the second conductive polymer (second-A conductive polymer and second-B conductive polymer) are preferably used in combination.

The first conductive polymer layer and the second conductive polymer layer may further contain other components within a range not impairing the effects of the present disclosure.

Hereinafter, a configuration of the electrolytic capacitor will be described in more detail.

(Anode Body)

A conductive material having a large surface area can be used as the anode body. Examples of the conductive material include a valve metal, an alloy containing a valve metal, and a compound containing a valve metal. One of these materials can be used alone, or two or more of these materials can be used in combination. As the valve metal, for example, aluminum, tantalum, niobium, or titanium is preferably used. The anode body having a porous surface can be obtained by, for example, roughening a surface of a base material (such as a foil-like or plate-like base material) formed of a conductive material by etching or the like. Further, the anode body may be a molded body of particles of a conductive material or a sintered body thereof. The sintered body has a porous structure. That is, when the anode body is a sintered body, the whole anode body can be porous.

(Dielectric Layer)

The dielectric layer is formed by anodizing, through a chemical oxidation treatment or the like, the conductive material on a surface of the anode body. As a result of anodizing, the dielectric layer contains an oxide of the conductive material (particularly a valve metal). For example, when tantalum is used as the valve metal, the dielectric layer contains $Ta_2O_5$, and when aluminum is used as the valve metal, the dielectric layer contains $Al_2O_3$. Note that dielectric layer is not limited to these examples, and any layer is acceptable as the dielectric layer as long as the layer functions as a dielectric body.

When a surface of the anode body is porous, the dielectric layer is formed along the surface of the anode body (the surface including inner wall faces of holes or pits of the anode body).

(Solid Electrolyte Layer)

Hereinafter, items common to conductive polymer layers constituting the solid electrolyte layer will be described.

A weight-average molecular weight of the conductive polymer is not particularly limited and ranges, for example, from 1,000 to 1,000,000, inclusive.

The conductive polymer can be obtained by, for example, polymerizing a precursor of the conductive polymer. Examples of the precursor of the conductive polymer include a monomer that constitutes the conductive polymer and/or an oligomer in which some monomers are linked to each other. As a polymerization method, both chemical oxidation polymerization and electrolytic oxidation polymerization can be employed.

The conductive polymer layer may further contain dopant. In the conductive polymer layer, the dopant may be contained in a state of being doped into the conductive polymer, or may be contained in a state of being bonded to the conductive polymer. The conductive polymer that is bonded to or doped with the dopant can be obtained by polymerizing a precursor of the conductive polymer under existence of the dopant.

As the dopant, one having an anionic group such as a sulfonate group, a carboxy group, a phosphate group (—O—P($=$O)(—OH)$_2$), and/or a phosphonate group (—P($=$O)(—OH)$_2$) is used. The dopant may have one anionic group, or two or more anionic groups. As the anionic group, the sulfonate group is preferred, and a combination of the sulfonate group with an anionic group other than the sulfonate group is also acceptable. The dopant may be low-molecular dopant or high-molecular dopant. The conductive polymer layer may contain only one dopant, or two or more dopants.

Examples of the low-molecular dopant include alkylbenzenesulfonic acids such as benzenesulfonic acid and p-toluenesulfonic acid, naphthalenesulfonic acid, and anthraquinonesulfonic acid.

Examples of the high-molecular dopant include a homopolymer of a monomer having a sulfonate group, a copolymer of a monomer having a sulfonate group and another monomer, and a sulfonated phenolic resin.

Examples of the monomer having a sulfonate group include styrenesulfonic acid, vinylsulfonic acid, allylsulfonic acid, 2-acrylamido-2-methylpropanesulfonic acid, and isoprenesulfonic acid. As other monomers, aromatic dicarboxylic acids such as phthalic acid, isophthalic acid and terephthalic acid are preferable. Further, examples of other monomers include acrylic acid. Specifically, examples of the polymer dopant include polystyrene sulfonic acid (PSS).

A weight-average molecular weight of the polymer dopant ranges, for example, from 1,000 to 1,000,000, inclusive. Use of polymer dopant having such a molecular weight easily facilitates reduction of ESR.

An amount of the dopant contained in the conductive polymer layer ranges preferably from 10 parts by mass to 1,000 parts by mass, inclusive, with respect to 100 parts by mass of the conductive polymer.

FIG. 1 is a cross-sectional view schematically illustrating a configuration of an electrolytic capacitor according to one exemplary embodiment of the present disclosure. As shown in FIG. 1, electrolytic capacitor 1 includes capacitor element 2, resin sealing material 3 for sealing capacitor element 2, and anode terminal 4 and cathode terminal 5 at least partially exposed to the outside of resin sealing material 3, respectively. Anode terminal 4 and cathode terminal 5 can be formed of, for example, metal such as copper or copper alloy. Resin sealing material 3 has an outer shape that is a substantially rectangular parallelepiped, and electrolytic capacitor 1 also has an outer shape that is a substantially rectangular parallelepiped. As a material of resin sealing material 3, for example, an epoxy resin can be used.

Capacitor element 2 includes anode body 6, dielectric layer 7 covering anode body 6, and cathode part 8 covering dielectric layer 7. Cathode part 8 includes solid electrolyte layer 9 covering dielectric layer 7 and cathode lead-out layer 10 covering solid electrolyte layer 9. Cathode lead-out layer 10 includes carbon layer 11 and silver paste layer 12.

Anode body 6 includes an area that opposes cathode part 8 and an area that does not oppose cathode part 8. In an area of anode body 6 that does not oppose cathode part 8, on a part adjacent to cathode part 8, insulating separation layer 13 is formed so as to zonally cover a surface of anode body 6, thereby regulating contact between cathode part 8 and anode body 6. In the area of anode body 6 that does not oppose cathode part 8, another part is electrically connected to anode terminal 4 by welding. Cathode terminal 5 is electrically connected to cathode part 8 via adhesive layer 14 formed of a conductive adhesive.

As anode body 6, one made by roughening a surface of a base material (such as a foil-like or plate-like base material) formed of a conductive material is used. For example, one made by roughening a surface of an aluminum foil by etching is used as anode body 6. Dielectric layer 7 contains, for example, an aluminum oxide such as $Al_2O_3$.

Main surface 4S of anode terminal 4 and main surface 5S of cathode terminal 5 are exposed from the same face of resin sealing material 3. This exposure face is used for soldering connection with a substrate (not shown) on which electrolytic capacitor 1 is to be mounted.

It is sufficient if carbon layer 11 has conductivity, and carbon layer 11 can be configured, for example, by using a conductive carbon material such as graphite. For silver paste layer 12, for example, there can be used a composition containing a silver powder and a binder resin (such as an epoxy resin). A configuration of cathode lead-out layer 10 is not limited to this example, and it is sufficient if cathode lead-out layer 10 has a current collection function.

Figure 2:
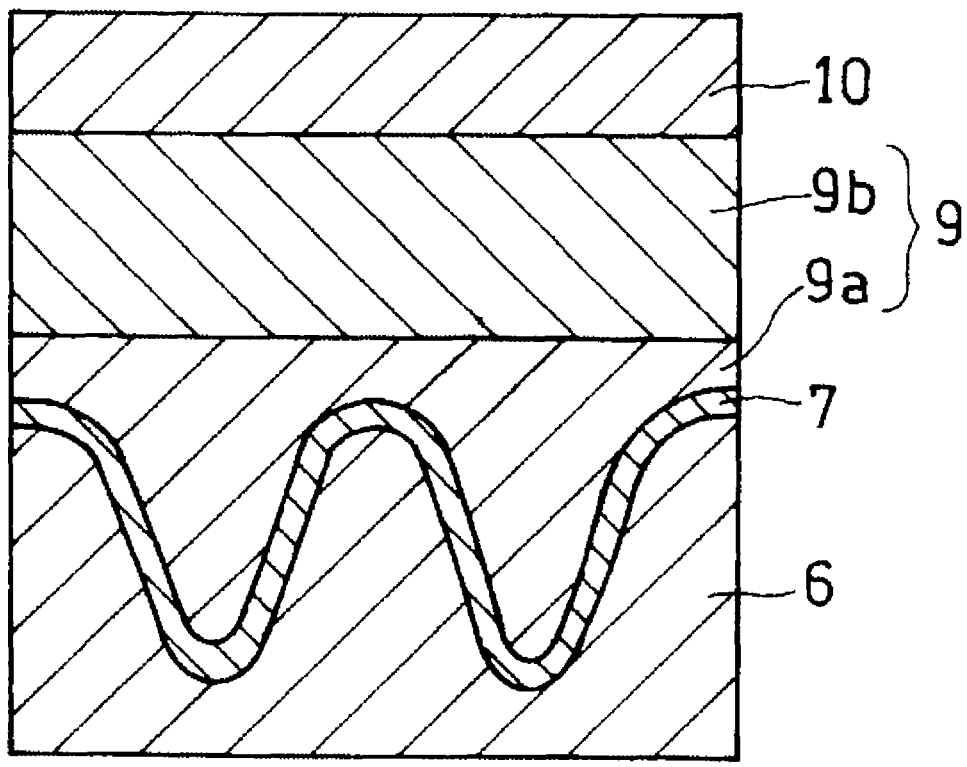
FIG. 2 is a schematic cross-sectional view illustrating an enlarged main part of the electrolytic capacitor shown in FIG. 1.

As shown in FIG. 2, solid electrolyte layer 9 has, in order from dielectric layer 7, first conductive polymer layer 9a containing a first-A conductive polymer having a thiophene skeleton and a second-A conductive polymer having an aniline skeleton, and second conductive polymer layer 9b containing a first-B conductive polymer having a thiophene skeleton and a second-B conductive polymer having an aniline skeleton. A mass ratio $W_{2a}$ of the second-A conductive polymer contained in the first conductive polymer layer and a mass ratio $W_{2b}$ of the second-B conductive polymer contained in the second conductive polymer layer satisfy a relational formula (3):

$$0 \leq W_{2b}/W_{2a} < 1, \text{ and } 0 < W_{2a} \qquad (3).$$

First conductive polymer layer 9a is formed so as to cover dielectric layer 7, and second conductive polymer layer 9b is formed so as to cover first conductive polymer layer 9a. Solid electrolyte layer 9 (first conductive polymer layer 9a) does not necessarily cover whole (a whole surface of) dielectric layer 7 and is satisfactory as long as solid electrolyte layer 9 is formed so as to cover at least a portion of dielectric layer 7.

Dielectric layer 7 is formed along a surface (a surface including inner wall faces of holes) of anode body 6. A surface of dielectric layer 7 is formed to have an irregular shape corresponding to a shape of the surface of anode body 6, as shown in FIG. 2. In order to further suppress peeling off from dielectric layer 7 due to shrinkage of first conductive polymer layer 9a caused by repeated charging and discharging, first conductive polymer layer 9a is preferably formed to fill such irregularities of dielectric layer 7.

The electrolytic capacitor of the present disclosure is not limited to an electrolytic capacitor having the above structure and can be applied to electrolytic capacitors having various structures. Specifically, the present disclosure can also be applied to, for example, a wound electrolytic capacitor and an electrolytic capacitor including a metal powder sintered body as the anode body.

[Method for Producing Electrolytic Capacitor]

A method for producing an electrolytic capacitor includes a first step (a step of forming first conductive polymer layer) of allowing a first conductive polymer and a second conductive polymer to adhere to an anode body having a dielectric layer formed on a surface of the anode body by bringing a first treatment liquid to contact the anode body. The first treatment liquid contains the first conductive polymer having a thiophene skeleton and the second conductive polymer having an aniline skeleton. And the method further includes a second step (a step of forming second conductive polymer layer) of allowing, after the first step, at least the first conductive polymer to adhere to the anode body by bringing a second treatment liquid to contact the anode body to which the first conductive polymer and the second conductive polymer have adhered. The second treatment liquid contains the first conductive polymer and has a smaller mass ratio of the second conductive polymer with respect to a total mass of the first conductive polymer and the second conductive polymer than the first treatment liquid.

More specifically, the method includes a first step of bringing a first treatment liquid containing a first-A conductive polymer and a second-A conductive polymer to contact an anode body having a dielectric layer formed on a surface of the anode body and allowing the first-A conductive polymer and the second-A conductive polymer to adhere to the anode body. And the method further includes a second step of bringing, after the first step, a second treatment liquid containing a first-B conductive polymer and a second-B conductive polymer to contact the anode body to which the first-A conductive polymer and the second-A conductive polymer have adhered and allowing the first-B conductive polymer and the second-B conductive polymer to adhere to the anode body. A mass ratio $W_{L1}$ of the second-A conductive polymer contained in the first treatment liquid and a mass ratio $W_{L2}$ of the second-B conductive polymer contained in the second treatment liquid satisfy a relational formula (4):

$$0 \leq W_{L2}/W_{L1} < 1, \text{ and } 0 < W_{L1} \qquad (4).$$

Here, $W_{L1}$ represents a mass ratio (parts by mass) of the second-A conductive polymer with respect to 100 parts by mass of the total of the first-A conductive polymer and the second-A conductive polymer contained in the first treatment liquid. $W_{L2}$ represents a mass ratio (parts by mass) of the second-B conductive polymer with respect to 100 parts by mass of the total of the first-B conductive polymer and the second-B conductive polymer contained in the second treatment liquid.

In a case where a mass ratio of the second conductive polymer contained in the second treatment liquid is smaller than a mass ratio of the second conductive polymer contained in the first treatment liquid, that is, in a case where the relational formula (4) is satisfied, capacitance decrease after the repeated charging and discharging is suppressed. Further, an electrolytic capacitor having a high capacitance and excellent in withstand voltage characteristics can be obtained. $W_{L2}/W_{L1}$ ranges preferably from 0 to 0.8, inclusive, and more preferably from 0 to 0.5, inclusive.

Each of the first treatment liquid and the second treatment liquid contains the first conductive polymer (first-A conductive polymer and first-B conductive polymer) having a thiophene skeleton. Thus, an electrolytic capacitor having a high capacitance and excellent in withstand voltage characteristics can be obtained by forming the first conductive polymer layer containing the first-A conductive polymer and the second conductive polymer layer containing the first-B conductive polymer by using the first treatment liquid and the second treatment liquid.

The first treatment liquid contains the second conductive polymer (second-A conductive polymer). Therefore, formation of the first conductive polymer layer containing the second conductive polymer (second-A conductive polymer) by use of the first treatment liquid reduces shrinkage of the solid electrolyte layer (first conductive polymer layer) due to repeated charging and discharging. That is, shrinkage of the solid electrolyte layer (first conductive polymer layer) due to repeated charging and discharging is suppressed, and the first conductive polymer layer is hardly peeled off from the dielectric layer or the like. As a result, capacitance decrease of the electrolytic capacitor after the repeated charging and discharging is suppressed.

The second treatment liquid may not contain the second conductive polymer (second-B conductive polymer) but desirably contains the second conductive polymer (second-B conductive polymer) from the viewpoint of further suppressing the capacitance decrease after the repeated charging and discharging. However, in a case where the mass ratio of the second conductive polymer contained in the second treatment liquid is greater than or equal to the mass ratio of the second conductive polymer contained in the first treatment liquid, that is, in a case where $1 \leq W_{L2}/W_{L1}$ is satisfied, the withstand voltage characteristics decrease because the mass ratio of the first conductive polymer (first-B conductive polymer) is relatively small. In addition, an initial capacitance may decrease.

In a case where the first treatment liquid does not contain the second conductive polymer, that is, in a case of $W_{L1}=0$, the first conductive polymer layer formed by using the first treatment liquid does not contain the second conductive polymer (second-A conductive polymer), and thus the capacitance after the repeated charging and discharging decreases.

The method for producing the electrolytic capacitor may include a step of preparing an anode body and a step of forming a dielectric layer on the anode body prior to the first step and the second step. The production method may further include a step of forming a cathode lead-out layer.

Hereinafter, the steps will be described in more detail.

(Step of Preparing Anode Body)

In this step, the anode body is formed by a publicly known method according to a kind of the anode body.

The anode body can be prepared by, for example, roughening a surface of a foil-like or plate-like base material formed of a conductive material. It is sufficient that roughening can form irregularities on the surface of the base material. Roughening may be conducted, for example, by subjecting the surface of the base material to etching (for example, electrolytic etching), or by depositing particles of a conductive material on the surface of the base material using a gas phase method such as vapor deposition.

In addition, a valve metal powder is prepared, and in a state in which one end side of a rod-like anode lead in a longitudinal direction is embedded in the powder, a molded body molded into a desired shape (for example, block-like shape) is obtained. This molded body may be sintered to form an anode body of porous structure in which one end of the anode lead is embedded.

(Step of Forming Dielectric Layer)

In this step, a dielectric layer is formed on the anode body. The dielectric layer is formed by anodizing the anode body through a chemical oxidation treatment or the like. The anodizing can be performed by a publicly known method, for example, an anodizing treatment. The anodizing treatment can be performed by, for example, immersing the anode body in an anodizing solution to impregnate a surface of the anode body, on which the dielectric layer is formed, with the anodizing solution and applying a voltage between the anode body as an anode and a cathode immersed in the anodizing solution. It is preferable to use, for example, a phosphoric acid aqueous solution as the anodizing solution.

(Step of Forming First Conductive Polymer Layer)

In the first step, the first conductive polymer layer is formed so as to cover at least a part of the dielectric layer. In the first step, for example, a first treatment liquid containing a first-A conductive polymer and a second-A conductive polymer is made to contact the anode body with the dielectric layer formed thereon to allow the first-A conductive polymer and second-A conductive polymer to adhere to the anode body. In this case, a first conductive polymer layer having dense film quality can be formed. The first treatment liquid may further contain other components such as dopant.

The step of forming the first conductive polymer layer includes, for example, a step a of immersing the anode body with the dielectric layer formed thereon in the first treatment liquid or applying or dropping the first treatment liquid onto the anode body with the dielectric layer formed thereon, and thereafter drying the first treatment liquid. The step a may be performed several times.

The first treatment liquid is, for example, a dispersion liquid (solution) of a first-A conductive polymer and a second-A conductive polymer. An average particle size of particles of the first-A conductive polymer present in the first treatment liquid ranges, for example, from 5 nm to 800 nm, inclusive. An average particle size of particles of the second-A conductive polymer present in the first treatment liquid is, for example, less than or equal to 400 nm. The average particle size of the conductive polymer can be obtained from, for example, particle size distribution by a dynamic light scattering method.

Since the first-A conductive polymer has a thiophene skeleton and the second-A conductive polymer has an aniline skeleton, it is preferable to use the first treatment liquid as a dispersion liquid of the first-A conductive polymer and also as a solution of the second-A conductive polymer. The first treatment liquid may be prepared by compounding a dispersion liquid of the first-A conductive polymer and a solution of the second-A conductive polymer. In addition, the first treatment liquid may be prepared by charging and dispersing a powdery first-A conductive polymer into the solution of the second-A conductive polymer.

Examples of a dispersion medium (solvent) used for the first treatment liquid include water, organic solvent, and mixtures thereof. Examples of the organic solvent include monohydric alcohols such as methanol, ethanol and propanol, polyhydric alcohols such as ethylene glycol and glycerin, and aprotic polar solvents such as N, N-dimethylformamide, dimethylsulfoxide, acetonitrile, acetone, and benzonitrile.

(Step of Forming Second Conductive Polymer Layer)

In the second step, the second conductive polymer layer is formed so as to cover at least a part of the first conductive polymer layer. In the second step, for example, after the first step, a second treatment liquid containing a first-B conductive polymer and a second-B conductive polymer is made to contact the anode body to which the first-A conductive polymer and second-A conductive polymer adhere to allow the first-B conductive polymer and second-B conductive polymer to adhere to the anode body. In this case, a second conductive polymer layer having dense film quality can be formed. The second treatment liquid may further contain other components such as dopant.

The step of forming the second conductive polymer layer includes, for example, a step b of immersing the first conductive polymer layer in the second treatment liquid or applying or dropping the second treatment liquid onto the first conductive polymer layer, and thereafter drying the second treatment liquid. The step b may be repeated several times.

The second treatment liquid is, for example, a dispersion liquid (solution) of the first-B conductive polymer and second-B conductive polymer. An average particle size of particles of the first-B conductive polymer present in the second treatment liquid ranges, for example, from 5 nm to 800 nm, inclusive. An average particle size of particles of the second-B conductive polymer present in the second treatment liquid is, for example, less than or equal to 400 nm.

Since the first-B conductive polymer has a thiophene skeleton and the second-B conductive polymer has an aniline skeleton, it is preferable to use the second treatment liquid as a dispersion liquid of the first-B conductive polymer and also as a solution of the second-B conductive polymer. The second treatment liquid may be prepared by compounding a dispersion liquid of the first-B conductive polymer and a solution of the second-B conductive polymer. In addition, the second treatment liquid may be prepared by charging and dispersing a powdery first-B conductive polymer into the solution of the second-B conductive polymer.

The second treatment liquid may not contain the second-B conductive polymer. In this case, a dispersion liquid of the first-B conductive polymer may be used for the second treatment liquid.

In order to form a solid electrolyte layer (second conductive polymer layer) with a sufficient thickness, an average particle size of particles of the first-B conductive polymer is preferably larger than the average particle size of particles of the first-A conductive polymer.

Further, in order to form the second conductive polymer layer with a sufficient thickness, as the second treatment liquid, one having a high solid content concentration of the conductive polymer in the treatment liquid as compared to the first treatment liquid may be used, and the number of times of step b in which the second treatment liquid is used may be increased.

Further, when the average particle size of particles of the first-B conductive polymer is nearly equal to the average particle size of particles of the first-A conductive polymer, a third treatment liquid containing particles of a first-C conductive polymer having an average particle size larger than the average particle size of particles of the first-B conductive polymer may be used to form a third conductive polymer layer on the second conductive polymer layer. In this case, the solid electrolyte layer (third conductive polymer layer) can be formed with a sufficient thickness. The first-C conductive polymer has a thiophene skeleton and has a molecular structure that may be the same as or different from a molecular structure of the first-B conductive polymer.

A step of forming the third conductive polymer layer includes, for example, a step c of immersing the second conductive polymer layer obtained in the second step in the third treatment liquid or applying or dropping the third treatment liquid onto the second conductive polymer layer obtained in the second step, and thereafter drying the third treatment liquid. The step c may be repeated several times.

The third treatment liquid is, for example, a dispersion liquid or a solution of the first-C conductive polymer. An average particle size of particles of the first-C conductive polymer present in the third treatment liquid ranges, for example, from 5 nm to 800 nm, inclusive. Since the first-C conductive polymer has a thiophene skeleton, preferably, a dispersion liquid of the first-C conductive polymer is used for forming the third conductive polymer layer.

Examples of a dispersion medium (solvent) used for the second treatment liquid and the third treatment liquid include those exemplified for the first treatment liquid.

(Step of Forming Cathode Lead-Out Layer)

In this step, a cathode lead-out layer is formed by sequentially stacking a carbon layer and a silver paste layer on the surface (preferably of the solid electrolyte layer formed) of the anode body obtained in the second step.

EXAMPLES

Hereinafter, the present disclosure will be specifically described based on Examples and Comparative Examples. The present disclosure, however, is not limited to Examples below.

Example 1

Electrolytic capacitor 1 shown in FIG. 1 was fabricated in the manner described below, and characteristics of the electrolytic capacitor were evaluated.

(1) Step of Preparing Anode Body

An aluminum foil (with a thickness of 100 µm) was prepared as a base material, and etching was performed on a surface of the aluminum foil, so as to obtain anode body 6. An insulating resist tape (separation layer 13) was attached at a prescribed position of anode body 6.

(2) Step of Forming Dielectric Layer

Anode body 6 was immersed in a phosphate acid solution in a concentration of 0.3% by mass (at a liquid temperature of 70° C.), and a DC voltage of 70 V was applied for 20 minutes, thereby forming dielectric layer 7 containing an aluminum oxide ($Al_2O_3$) on a surface of anode body 6.

(3) Step of Forming First Conductive Polymer Layer (First Step)

Poly(3,4-ethylenedioxythiophene) (PEDOT) water-dispersion liquid (in a concentration of 2% by mass, with the average particle size 400 nm of PEDOT particles including dopant) containing polystyrene sulfonic acid (PSS) as dopant and polyaniline (PANT) aqueous solution (in a concentration of 5% by mass) were mixed to prepare a first treatment liquid containing a first-A conductive polymer (PEDOT) and a second-A conductive polymer (PANT) in a mass ratio of 55:45.

After anode body 6 on which dielectric layer 7 was formed was immersed in the first treatment liquid, a step of drying the first treatment liquid at 120° C. for 10 to 30 minutes was repeated once to form first conductive polymer layer 9a.

(4) Step of Forming Second Conductive Polymer Layer (Second Step)

As the second treatment liquid containing the second-A conductive polymer (PEDOT), a PEDOT water-dispersion liquid (in a concentration of 4% by mass, with the average particle size 600 nm of PEDOT particles including dopant) containing PSS as dopant was prepared. After the anode body on which the first conductive polymer layer was formed was immersed in the second treatment liquid, a step of drying the second treatment liquid at 190° C. for 2 to 5 minutes was performed once to form second conductive polymer layer 9b.

(5) Step of Forming Cathode Lead-Out Layer

On second conductive polymer layer 9b (the anode body having a surface on which the dielectric layer, the first conductive polymer layer, and the second conductive polymer layer were sequentially formed), a dispersion liquid with graphite particles dispersed in water was applied and subsequently dried in the atmosphere, thereby forming carbon layer 11 on a surface of second conductive polymer layer 9b.

Then, a silver paste containing silver particles and a binder resin (epoxy resin) was applied onto a surface of carbon layer 11, and thereafter, the binder resin was cured by heating to form silver paste layer 12. In this manner, cathode lead-out layer 10 constituted of carbon layer 11 and silver paste layer 12 was formed.

Thus, capacitor element 2 was obtained.

(6) Assembling of Electrolytic Capacitor

Anode terminal 4, cathode terminal 5, and adhesive layer 14 were disposed on obtained capacitor element 2 and were sealed with resin sealing material 3, thereby producing an electrolytic capacitor.

Examples 2 to 5

An electrolytic capacitor was fabricated as in Example 1 except that a mass ratio of the first-A conductive polymer (PEDOT) and second-A conductive polymer (PANI) was changed to a value shown in Table 1.

Example 6

PEDOT water-dispersion liquid (in a concentration of 2% by mass, with the average particle size 400 nm of PEDOT particles including dopant) containing PSS as dopant and PANI aqueous solution (in a concentration of 5% by mass) were mixed to prepare a first treatment liquid containing a first-A conductive polymer (PEDOT) and a second-A conductive polymer (PANT) in a mass ratio of 55:45.

After the anode body on which the dielectric layer was formed was immersed in the first treatment liquid, a step of drying the first treatment liquid at 120° C. for 10 to 30 minutes was repeated once to form the first conductive polymer layer.

PEDOT water-dispersion liquid (in a concentration of 4% by mass, with the average particle size 600 nm of PEDOT particles including dopant) containing PSS as dopant and PANI aqueous solution (in a concentration of 5% by mass) were mixed to prepare a second treatment liquid containing a first-B conductive polymer (PEDOT) and a second-B conductive polymer (PANT) in a mass ratio of 95:5.

After the anode body on which the first conductive polymer layer was formed was immersed in the second treatment liquid, a step of drying the second treatment liquid at 190° C. for 2 to 5 minutes was performed once to form the second conductive polymer layer.

An electrolytic capacitor was fabricated as in Example 1 except for formation of the first conductive polymer layer and the second conductive polymer layer.

Comparative Example 1

A PANI aqueous solution (in a concentration of 5% by mass) was prepared as the first treatment liquid containing the second-A conductive polymer (PANI). After the anode body on which the dielectric layer was formed was immersed in the first treatment liquid, a step of drying the first treatment liquid at 120° C. for 10 to 30 minutes was repeated once to form the first conductive polymer layer.

As the second treatment liquid containing the first-B conductive polymer (PEDOT), a PEDOT water-dispersion liquid (in a concentration of 4% by mass, with the average particle size 600 nm of PEDOT particles including dopant) containing PSS as dopant was prepared. After the anode body on which the first conductive polymer layer was formed was immersed in the second treatment liquid, a step of drying the second treatment liquid at 190° C. for 2 to 5 minutes was performed once to form the second conductive polymer layer.

An electrolytic capacitor was fabricated as in Example 1 except for formation of the first conductive polymer layer and the second conductive polymer layer.

Comparative Example 2

As the first treatment liquid containing the first-A conductive polymer (PEDOT), a PEDOT water-dispersion liquid (in a concentration of 2% by mass, with the average particle size 400 nm of PEDOT particles including dopant) containing PSS as dopant was prepared. After anode body 6 on which dielectric layer 7 was formed was immersed in the first treatment liquid, a step of drying the first treatment liquid at 120° C. for 10 to 30 minutes was repeated once to form the first conductive polymer layer.

As the second treatment liquid containing the first-B conductive polymer (PEDOT), a PEDOT water-dispersion liquid (in a concentration of 4% by mass, with the average particle size 600 nm of PEDOT particles including dopant) containing PSS as dopant was prepared. After the anode body on which the first conductive polymer layer was formed was immersed in the second treatment liquid, a step of drying the second treatment liquid at 190° C. for 2 to 5 minutes was performed once to form the second conductive polymer layer.

An electrolytic capacitor was fabricated as in Example 1 except for formation of the first conductive polymer layer and the second conductive polymer layer.

Comparative Example 3

PEDOT water-dispersion liquid (in a concentration of 2% by mass, with the average particle size 400 nm of PEDOT particles including dopant) containing PSS as dopant and PANI aqueous solution (in a concentration of 5% by mass) were mixed to prepare a first treatment liquid containing a first-A conductive polymer (PEDOT) and a second-A conductive polymer (PANT) in a mass ratio of 55:45.

After the anode body on which the dielectric layer was formed was immersed in the first treatment liquid, a step of drying the first treatment liquid at 120° C. for 10 to 30 minutes was repeated once to form the first conductive polymer layer.

PEDOT water-dispersion liquid (in a concentration of 4% by mass, with the average particle size 600 nm of PEDOT particles including dopant) containing PSS as dopant and PANI aqueous solution (in a concentration of 5% by mass) were mixed to prepare a second treatment liquid containing a first-B conductive polymer (PEDOT) and a second-B conductive polymer (PANT) in a mass ratio of 55:45.

After the anode body on which the first conductive polymer layer was formed was immersed in the second treatment liquid, a step of drying the second treatment liquid at 190° C. for 2 to 5 minutes was performed once to form the second conductive polymer layer.

An electrolytic capacitor was fabricated as in Example 1 except for formation of the first conductive polymer layer and the second conductive polymer layer.

Comparative Example 4

As the first treatment liquid containing the first-A conductive polymer (PEDOT), PEDOT water-dispersion liquid (in a concentration of 2% by mass, with the average particle size 400 nm of PEDOT particles including dopant) containing PSS as dopant was prepared. After the anode body on which the dielectric layer was formed was immersed in the first treatment liquid, a step of drying the first treatment liquid at 120° C. for 10 to 30 minutes was repeated once to form the first conductive polymer layer.

PEDOT water-dispersion liquid (in a concentration of 4% by mass, with the average particle size 600 nm of PEDOT particles including dopant) containing PSS as dopant and PANI aqueous solution (in a concentration of 5% by mass) were mixed to prepare a second treatment liquid containing a first-B conductive polymer (PEDOT) and a second-B conductive polymer (PANT) in a mass ratio of 55:45.

After the anode body on which the first conductive polymer layer was formed was immersed in the second treatment liquid, a step of drying the second treatment liquid at 190° C. for 2 to 5 minutes was performed once to form the second conductive polymer layer.

An electrolytic capacitor was fabricated as in Example 1 except for formation of the first conductive polymer layer and the second conductive polymer layer.

[Evaluation]

(1) Measurement of Initial Capacitance

Under an environment at 25° C., an initial electrostatic capacity (capacitance A) at a frequency of 120 Hz of the electrolytic capacitor was measured using an LCR meter for four-terminal measurement. Capacitance A of each electrolytic capacitor was expressed as an index number using capacitance A of Comparative Example 1 as a base of 100.

(2) Measurement of Capacitance Decrease Rate after Repeated Charging and Discharging An electrolytic capacitor was subjected to charging for 5 seconds and discharging for 5 seconds alternately 10,000 times under an environment at 25° C. and under a voltage that is 1.25 times the rated voltage. Thereafter, capacitance B was measured in a manner similar to the above (1).

Then, the capacitance decrease rate (%) after repeated charging and discharging was obtained with the following equation.

Capacitance decrease rate (%) after repeated charging and discharging=(capacitance $A$−capacitance $B$)/capacitance $A$×100.

(3) Measurement of Withstand Voltage Characteristics

A voltage of the electrolytic capacitor was increased at a rate of 1 V/s, and a voltage value (V) was measured at a time when a current value exceeded 0.5 A. A voltage value of each electrolytic capacitor was expressed as an index number using a voltage value of Comparative Example 1 as a base of 100. Withstand voltage characteristics are improved as the voltage value increases.

Table 1 and Table 2 show results of the evaluation.

TABLE 1

| | First Conductive Polymer Layer | | Second Conductive Polymer Layer | | | Evaluation | | |
|---|---|---|---|---|---|---|---|---|
| | First-A Conductive Polymer (Parts By Mass) | Second-A Conductive Polymer (Parts By Mass) | First-B Conductive Polymer (Parts By Mass) | Second-B Conductive Polymer (Parts By Mass) | $W_{2b}/W_{2a}$ | Initial Capacitance (Index Number) | Capacitance Decrease Rate After Repeated Charging And Discharging (%) | Withstand Voltage Characteristics (Index Number) |
| Comparative Example 1 | 0 | 100 | 100 | 0 | 0 | 7 | 5 | 40 |
| Example 2 | 20 | 80 | 100 | 0 | 0 | 90 | 5 | 100 |
| Example 3 | 25 | 75 | 100 | 0 | 0 | 99 | 4 | 101 |
| Example 1 | 55 | 45 | 100 | 0 | 0 | 99 | 4 | 100 |
| Example 4 | 90 | 10 | 100 | 0 | 0 | 103 | 35 | 102 |
| Example 5 | 95 | 5 | 100 | 0 | 0 | 101 | 28 | 101 |
| Comparative Example 2 | 100 | 0 | 100 | 0 | — | 100 | 60 | 100 |

TABLE 2

| | First Conductive Polymer Layer | | Second Conductive Polymer Layer | | | Evaluation | | |
| --- | --- | --- | --- | --- | --- | --- | --- | --- |
| | First-A Conductive Polymer (Parts By Mass) | Second-A Conductive Polymer (Parts By Mass) | First-B Conductive Polymer (Parts By Mass) | Second-B Conductive Polymer (Parts By Mass) | $W_{2b}/W_{2a}$ | Initial Capacitance (Index Number) | Capacitance Decrease Rate After Repeated Charging And Discharging (%) | Withstand Voltage Characteristics (Index Number) |
| Example 1 | 55 | 45 | 100 | 0 | 0 | 99 | 4 | 100 |
| Example 6 | 55 | 45 | 95 | 5 | 5/45 | 101 | 8 | 86 |
| Comparative Example 3 | 55 | 45 | 55 | 45 | 45/45 | 101 | 4 | 56 |
| Comparative Example 4 | 100 | 0 | 55 | 45 | — | 94 | 8 | 66 |

As shown in Table 1 and Table 2, in Examples 1 to 5, high capacitance, good repeated charging and discharging characteristics, and good withstand voltage characteristics were obtained at the same time.

In Comparative Example 1, since the first conductive polymer layer did not contain PEDOT, an initial capacitance decreased. In Comparative Example 2, the capacitance decreased largely after repeated charging and discharging. This result is conceivably due to that the effect of suppressing peeling off of the first conductive polymer layer from the dielectric layer due to repeated charging and discharging was not obtained because, in Comparative Example 2, the first conductive polymer layer and the second conductive polymer layer did not contain PANI. In Comparative Examples 3 and 4, the withstand voltage characteristics decreased because the mass ratio of PEDOT in the second conductive polymer layer was small.

The electrolytic capacitor according to the present disclosure can be used for various uses in which the high capacitance is required even after charging and discharging are repeated.

What is claimed is:

1. An electrolytic capacitor comprising:
an anode body;
a dielectric layer disposed on the anode body;
a solid electrolyte layer disposed on the dielectric layer; and
a cathode lead-out layer disposed on the solid electrolyte layer, wherein:
the solid electrolyte layer contains a first conductive polymer having a thiophene skeleton and a second conductive polymer having an aniline skeleton,
the solid electrolyte layer includes a first region and a second region, the first region being disposed closer to the dielectric layer than the second region is, the second region being disposed closer to the cathode lead-out layer than the first region is,
the first region contains the first conductive polymer and the second conductive polymer, and
a mass ratio of the second conductive polymer with respect to a total mass of the first conductive polymer and the second conductive polymer in the first region is greater than a mass ratio of the second conductive polymer with respect to a total mass of the first conductive polymer and the second conductive polymer in the second region.

2. The electrolytic capacitor according to claim 1, wherein:
at least a part of the anode body is porous,
a part of the solid electrolyte layer intrudes into holes of the anode body; and
the first region exists inside the holes of the anode body and the second region exists outside the holes of the anode body.

3. The electrolytic capacitor according to claim 2, wherein the mass ratio of the second conductive polymer in the first region ranges from 5 parts by mass to 80 parts by mass, inclusive, with respect to 100 parts by mass of the total of the first conductive polymer and the second conductive polymer in the first region.

4. The electrolytic capacitor according to claim 2, wherein the second region does not contain the second conductive polymer.

5. The electrolytic capacitor according to claim 1, wherein:
the first conductive polymer includes poly(3,4-ethylenedioxythiophene), and
the second conductive polymer includes polyaniline.

6. An electrolytic capacitor comprising:
an anode body;
a dielectric layer disposed on the anode body;
a solid electrolyte layer disposed on the dielectric layer; and
a cathode lead-out layer disposed on the solid electrolyte layer, wherein:
the solid electrolyte layer contains a first conductive polymer having a thiophene skeleton and a second conductive polymer having an aniline skeleton,
the solid electrolyte layer includes a first conductive polymer layer and a second conductive polymer layer, the second conductive polymer layer being disposed closer to the cathode lead-out layer than the first conductive polymer layer is,
the first conductive polymer layer contains the first conductive polymer and the second conductive polymer, and
a mass ratio of the second conductive polymer with respect to a total mass of the first conductive polymer and the second conductive polymer in the first conductive polymer layer is greater than a mass ratio of the second conductive polymer with respect to a total mass of the first conductive polymer and the second conductive polymer in the second conductive polymer layer.

7. The electrolytic capacitor according to claim 6, wherein the mass ratio of the second conductive polymer in the first conductive polymer layer ranges from 5 parts by mass to 80 parts by mass, inclusive, with respect to 100 parts by mass of the total of the first conductive polymer and the second conductive polymer in the first conductive polymer layer.

8. The electrolytic capacitor according to claim 6, wherein the second conductive polymer layer does not contain the second conductive polymer.

9. The electrolytic capacitor according to claim 6, wherein:
the first conductive polymer includes poly(3,4-ethylenedioxythiophene), and
the second conductive polymer includes polyaniline.

10. An electrolytic capacitor comprising:
an anode body;
a dielectric layer disposed on the anode body;
a solid electrolyte layer disposed on the dielectric layer; and
a cathode lead-out layer disposed on the solid electrolyte layer, wherein:
the solid electrolyte layer contains a first conductive polymer having a thiophene skeleton and a second conductive polymer having an aniline skeleton,
the solid electrolyte layer includes a first conductive polymer layer and a second conductive polymer layer, the second conductive polymer layer being disposed closer to the cathode lead-out layer than the first conductive polymer layer is,
a mass ratio of the second conductive polymer with respect to a total mass of the first conductive polymer and the second conductive polymer in the first conductive polymer layer is greater than a mass ratio of the second conductive polymer with respect to a total mass of the first conductive polymer and the second conductive polymer in the second conductive polymer layer, and
the mass ratio of the second conductive polymer in the first conductive polymer layer ranges from 5 parts by mass to 80 parts by mass, inclusive, with respect to 100 parts by mass of the total of the first conductive polymer and the second conductive polymer in the first conductive polymer layer.

11. The electrolytic capacitor according to claim 10, wherein the second conductive polymer layer does not contain the second conductive polymer.

12. The electrolytic capacitor according to claim 10, wherein:
the first conductive polymer includes poly(3,4-ethylenedioxythiophene), and
the second conductive polymer includes polyaniline.

13. An electrolytic capacitor comprising:
an anode body;
a dielectric layer disposed on the anode body;
a solid electrolyte layer disposed on the dielectric layer; and
a cathode lead-out layer disposed on the solid electrolyte layer, wherein:
the solid electrolyte layer contains a first conductive polymer having a thiophene skeleton and a second conductive polymer having an aniline skeleton,
at least a part of the anode body is porous,
a part of the solid electrolyte layer intrudes into holes of the anode body,
a mass ratio of the second conductive polymer with respect to a total mass of the first conductive polymer and the second conductive polymer in a first portion of the solid electrolyte layer that exists inside the holes of the anode body is greater than a mass ratio of the second conductive polymer with respect to a total mass of the first conductive polymer and the second conductive polymer in a second portion of the solid electrolyte layer that exists outside the holes of the anode body, and
the mass ratio of the second conductive polymer in the first portion of the solid electrolyte layer ranges from 5 parts by mass to 80 parts by mass, inclusive, with respect to 100 parts by mass of the total of the first conductive polymer and the second conductive polymer in the first portion of the solid electrolyte layer.

14. The electrolytic capacitor according to claim 13, wherein the second portion of the solid electrolyte layer does not contain the second conductive polymer.

15. The electrolytic capacitor according to claim 13, wherein:
the first conductive polymer includes poly(3,4-ethylenedioxythiophene), and
the second conductive polymer includes polyaniline.

* * * * *